United States Patent Office 3,125,494
Patented Mar. 17, 1964

3,125,494
CALCIUM L (+) LACTATE AND L (+) LACTIC ACID PRODUCTION
Raymond L. Snell, Elkhart, Ind., and Charles E. Lowery, Jr., Austin, Tex., assignors to Miles Laboratories, Inc., Elkhart, Ind., a corporation of Indiana
No Drawing. Filed Apr. 30, 1962, Ser. No. 191,345
3 Claims. (Cl. 195—36)

This invention relates to the production of calcium L (+) lactate and L (+) lactic acid. More particularly, it relates to a process of producing L (+) lactic acid by the fermentation of carbohydrates by organisms of the genus Rhizopus in the presence of a neutralizing agent.

Previous described processes for the production of lactic acid have employed glucose concentrations ranging from 13% to a maximum of 15%. Each process, however, is economically unsatisfactory in that calcium L (+) lactate crystallizes prior to complete fermentation of the sugar (due to its limited solubility at the temperature at which fermentation is conducted). This results in an arrest of the fermentation and an accumulation of a solid, white mass of calcium L (+) lactate within the fermentor. The residual sugar contaminates the desired end-product and the fermentor must be heated in order to liquify and dissolve this crystalline mass. The degree and amount of heat needed is that which is sufficient to cause a disintegration of the cellular material present, and this constitutes an additional source of contaminating material which must be removed from the end product, necessitating the introduction of additional processing steps.

Another disadvantage inherent in the prior art processes is the contamination of the product by fumaric, malic and succinic acids if the fermentation is allowed to proceed at elevated temperatures. Even temperatures of only 42° C. have been found in prior processes to produce decreased lactic acid yields.

It is an object of the present invention to provide an economically satisfactory method of utilizing high concentrations of carbohydrates in the production of L (+) lactic acid.

Another object of this invention is to produce lactic acid which is uncontaminated by fumaric, malic and succinic acids.

A further object is to obtain increased yields of L (+) lactic acid as a result of improved operational efficiency employing the application of elevated temperatures to the fermentation medium.

A still further object is to develop a method of producing L (+) lactic acid by the fermentation of high sugar concentrations uncontaminated by crystalline calcium L (+) lactate.

Finally, another object is to obtain a process whereby L (+) lactic acid may be directly recovered from the fermentation beers without the necessity of crystallizing calcium L (+) lactate.

It has now been discovered that by moderate heating of the fermentation solution when the calcium L (+) lactate concentration reaches or exceeds about 8%, as determined by routine analysis, a greater yield of calcium L (+) lactate and L (+) lactic acid is obtained which is substantially free from various acid contaminants and contaminants which would discolor the final product on heating. Temperatures of the order of about from 37° C. to 50° C. are effective for this purpose.

Generally, the present invention contemplates the production of calcium L (+) lactate and L (+) lactic acid by submerged fermentation of a nutrient medium consisting of carbohydrate, neutrient mineral salts, a neutralizing salt and a source of nitrogen, with an L (+) lactic acid producing strain of the genus Rhizopus. Subsequent to inoculation and during most of the fermentation cycle, the fermentation beer is exposed to temperatures of about from 30° C. to 37° C. (This varies anywhere from 1 to 60 hours.) I have found that, if, during the period immediately preceding complete fermentation of the carbohydrate, which corresponds to a time at which calcium L (+) lactate reaches or exceeds 8% this temperature is increased to between 37° C. and 50° C., the unexpected and unobvious result obtained is an increased yield of L (+) lactic acid and calcium L (+) lactate uncontaminated by cellular constituents or fumaric, malic or succinic acid salts, this process of secondary heating ranges from 2 to 30 hours.

The neutralizing salt added in solution dissociates so that the ranges of the cation present is from 16 mgm./ml. at the initial heating to 25 mgm./ml. at final temperature elevation.

L (+) lactic acid may be recovered as a colorless solution directly from the acidulated fermentation beers, without the necessity of crystallizing calcium L (+) lactate, in yields between 71% and 95%.

In commercial lactic acid production, calcium lactate crystallization is a means of reducing color and impurities. This is not necessary in this invention because the residues of color bodies and other impurities can be easily removed with a single carbon treatment.

All nutrient solutions recited hereinafter have the following compositions except where otherwise noted.

Germination medium: Grams/1000 ml.
  Commercial glucose (8% moisture) _____ 143.0
  $(NH_4)_2SO_4$ _____ 5.0
  $MgSO_4 \cdot 7H_2O$ _____ 0.25
  $ZnSO_4 \cdot 7H_2O$ _____ 0.088
  $KH_2PO_4$ _____ 0.60

Fermentation medium:
  Commercial glucose _____ 143.0
  $(NH_4)_2SO_4$ _____ 5.0
  $MgSO_4 \cdot 7H_2O$ _____ 0.25
  $ZnSO_4 \cdot 7H_2O$ _____ 0.044
  $KH_2PO_4$ _____ 0.60
  $CaCO_3$ _____ 72.0

Crude carbohydrate matter such as liquified corn meal, corn flour or starch can be substituted for glucose in the above formulations and still achieve the desired results.

The following examples are used to illustrate the practice of the disclosed invention but it will be understood that this is done for purposes of exemplification rather than limitation of that which is claimed.

*Example I*

Twenty-eight (28) liters of sterile germination medium were placed in a 15 gallon stainless steel agitated fermentor, operating at 215 r.p.m. and 0.17 volume/minute airflow, and inoculated with an aqueous suspension of spores of *Rhizopus oryzae* to give a concentration of $1.62 \times 10^9$ spores/liter. The temperature was maintained at 35° C. After 22.6 hours germination was examined microscopically and observed to be excellent. The germinated inoculum was then transferred to 1514 liters fermentation medium in a 500 gallon stainless steel agitated fermentor, operating at 42 r.p.m. agitator speed and 0.17 volume/minute airflow. $CaCO_3$ was added as an aqueous slurry at intermittent intervals at zero time, after 1.1 hours and after 20 hours. At all times the pH was maintained below 6.0. The temperature was maintained at 35° C. until the 48th hour of fermentation when temperature elevation was commenced. The temperature rise was permitted to continue until the 56th hour when it reached a peak of 44° C. Fermentation continued until the 57th hour, at which time the absence of glucose was indicated by the use of Clinistix® an extremely sensitive enzymatic glucose test having a sensitivity of 0.005%. Clinistix is a registered trademark of Ames Company, Inc., for a dip-and-read type of glucose indicator strip.

At the beginning of the temperature elevation period, calcium in solution was more than 16.4 mg./ml. and at the end, the calcium in solution was equivalent to 21.12 mg./ml.

Based upon 13% initial sugar, the yield in this fermentation was 71.8%.

Lactic acid was recovered by filtering the mycelium from the fermentation beer at 45° C., acidifying with dilute $H_2SO_4$ at 27° C., filtering off the $CaSO_4$ thus obtained, evaporating to 25% lactic acid, demineralizing and decolorizing again to a water-white product of USP Grade.

*Example II*

Employing the same conditions as described in Example I, except that temperature elevation was begun after 41.5 hours of fermentation at a soluble calcium level of 19.2 mg./ml., a yield of 76% was obtained in this fermentation. Temperature elevation was continued at 43° C. until 43.75 total hours had elapsed at which time there was no residual sugar and soluble calcium level was determined to be 22.0 mg./ml. Tests sensitive to 1 p.p.m. fumaric acid revealed that none was present in the water-white product thus obtained. The following example illustrates the same novel process as demonstrated on a medium of higher glucose concentration.

*Example III*

Spore germination medium and fermentation medium were identical to those described in Example I except that glucose concentration was 17%.

One liter cultures were made in Fernbach flasks which were then agitated on a rotary shaker at 27° C. Inocula were germlings from 250,000 spores of *Rhizopus oryzae*. After 52 hours, temperature elevation was initiated reaching 49° C. within a few hours. At 70.14 hours, 36 grams of $CaCO_3$ and 2 grams of $(NH_4)_2SO_4$ were added. At 80 hours, glucose was completely metabolized as confirmed by a test with an enzymatic glucose test, (Clinistix®). Calcium lactate content of the solution was 17.4%, equivalent to 14.13% lactic acid, representing a conversion efficiency of 78.5%.

In summary, this invention relates to an improvement in a process for producing calcium L (+) lactate and L (+) lactic acid whereby elevated temperatures are utilized immediately prior to complete metabolism by an L (+) lactic acid producing strain of *Rhizopus oryzae*. This results in a greater yield of L (+) lactic acid which is relatively free from contamination by residual carbohydrates and metabolic by-products of the fermentation. The production of a greater amount of L (+) lactic acid is a result of a novel improvement in the operational efficiency of the fermentation rather than chemical efficiency of the type or quality of ingredients thus employed.

What is claimed is:

1. In a process for producing L (+) lactic acid and calcium L (+) lactate by a submerged fermentation process comprising inoculating a medium containing carbohydrate, nutrient mineral salts, calcium carbonate, and a source of nitrogen with an L (+) lactic acid-producing strain of *Rhizopus oryzae* and heating the fermentation medium at 30° C. to 37° C. for 1 to 60 hours, the improvement comprising heating the fermentation medium to a temperature of about from 37° C. to 50° C. for 2 to 30 hours at the point where the concentration of calcium lactate reaches 8% by weight of the solution.

2. The process described in claim 1 wherein the fermentation medium is heated to said elevated temperatures at a point when the concentration of calcium in solution reaches 16 mg./ml. and said heating is continued until the carbohydrate is substantially, completely metabolized.

3. The process described in claim 1 wherein calcium L (+) lactate, substantially free from precipitated salts of fumaric, malic and succinic acids is recovered from said fermentation medium in a yield of about from 71% to 95% based upon the initial glucose concentration of the fermentation medium.

References Cited in the file of this patent

Industrial Microbiology, 3rd ed. (1959), pp. 630–636.